United States Patent [19]

Tandon et al.

[11] Patent Number: 4,737,854

[45] Date of Patent: Apr. 12, 1988

[54] IMAGE SENSOR ARRAY WITH TWO STAGE TRANSFER

[75] Inventors: Jagdish C. Tandon, Fairport; Pierre A. Lavallee, Penfield, both of N.Y.

[73] Assignee: Xerox Corporation, Stamford, Conn.

[21] Appl. No.: 886,692

[22] Filed: Jul. 18, 1986

[51] Int. Cl.4 .............................................. H04N 3/14
[52] U.S. Cl. ........................... 358/213.31; 358/213.27
[58] Field of Search ...................... 358/213.31, 213.29, 358/213.15, 213.16, 213.18, 213.27

[56] References Cited

U.S. PATENT DOCUMENTS

| | | | |
|---|---|---|---|
| 4,242,599 | 12/1980 | Suzuki | 307/311 |
| 4,274,113 | 6/1981 | Ohba et al. | 358/213.31 |
| 4,338,633 | 7/1982 | Malm | 358/213 |
| 4,407,010 | 9/1983 | Baji et al. | 358/213 |

OTHER PUBLICATIONS

The Bell System Technical Journal, "A Fundamental Comparison of Incomplete Charge Transfer in Charge Transfer Devices"; C. N. Berglund et al., Feb. 1973, vol. 52, No. 2, pp. 147–182.

"A Lensless Raster Input Scanner", J. C. Tandon et al; Xerox Disclosure Journal; vol. 6, No. 5, Sep./Oct. 1981, pp. 287–289.

Primary Examiner—Jin F. Ng
Assistant Examiner—Stephen Brinich
Attorney, Agent, or Firm—Frederick E. McMullen

[57] ABSTRACT

A linear image sensor array with a row of photodiodes and a transfer circuit for each photodiode, the circuit having a pair of transistors for two stage transfer of the image signal charge from the photodiode to the gate of one transistor of a two transistor source follower, a transistor for applying a bias charge to the photodiode, a multiplexing transistor for connecting the source follower output to an output line, a reset transistor for resetting the source follower, and clock signals for operating the transfer circuits in succession to serially output image signals to the output line.

5 Claims, 5 Drawing Sheets

IMAGE SENSOR ARRAY WITH TWO STAGE TRANSFER

The invention relates to an image sensor array, and more particularly, to an image sensor array with two stage transfer between the array sensors and the output.

In order to achieve high resolution imaging, an image sensor array having a relatively large number of photosites is required. However, attempts to provide an array with a high number of photosites have been generally unsuccessful and yields are low. An alternate arrangement envisions taking several image sensor arrays and abutting them together in end to end relation to form a longer composite array. Indeed, if this technology can be successfully practiced, full width or contact scanning arrays can be formed equal in size to the largest image to be scanned.

In considering the merits of joining sensor arrays together, it is deemed highly advantageous that pitch across the entire array be maintained and for this reason, it is important that spacing between adjoining photosites at the butted ends of the individual arrays be the same as the spacing between the photosites in the body of the arrays. In fabricating image sensor arrays, and especially image sensor arrays having the attributes necessary for end to end abutting with other like arrays, it is desirable to use NMOS or CMOS technology in order to take advantage of the very high yields possible with these types of technology. However, using NMOS or CMOS technology, single stage charge transfer can result in poor transfer efficiency between the high capacitance of the array photosites and the low input capacitance of the output charge to voltage converters.

The invention seeks to provide an improved image sensor array having high transfer efficiency, in which there is provided: a source follower with each sensor photosite for charge to voltage conversion of the image signal charge of the sensor photosites; two stage transfer means for transferring the image signal charge efficiently from the sensor photosites to the source follower and for minimizing feedback; means with each source follower for injecting a bias charge into the sensor photosites for transmittal to the source follower to enhance transfer efficiency; and switching means for outputting the image signal voltage from the source follower to the output.

IN THE DRAWINGS

Figure 1:
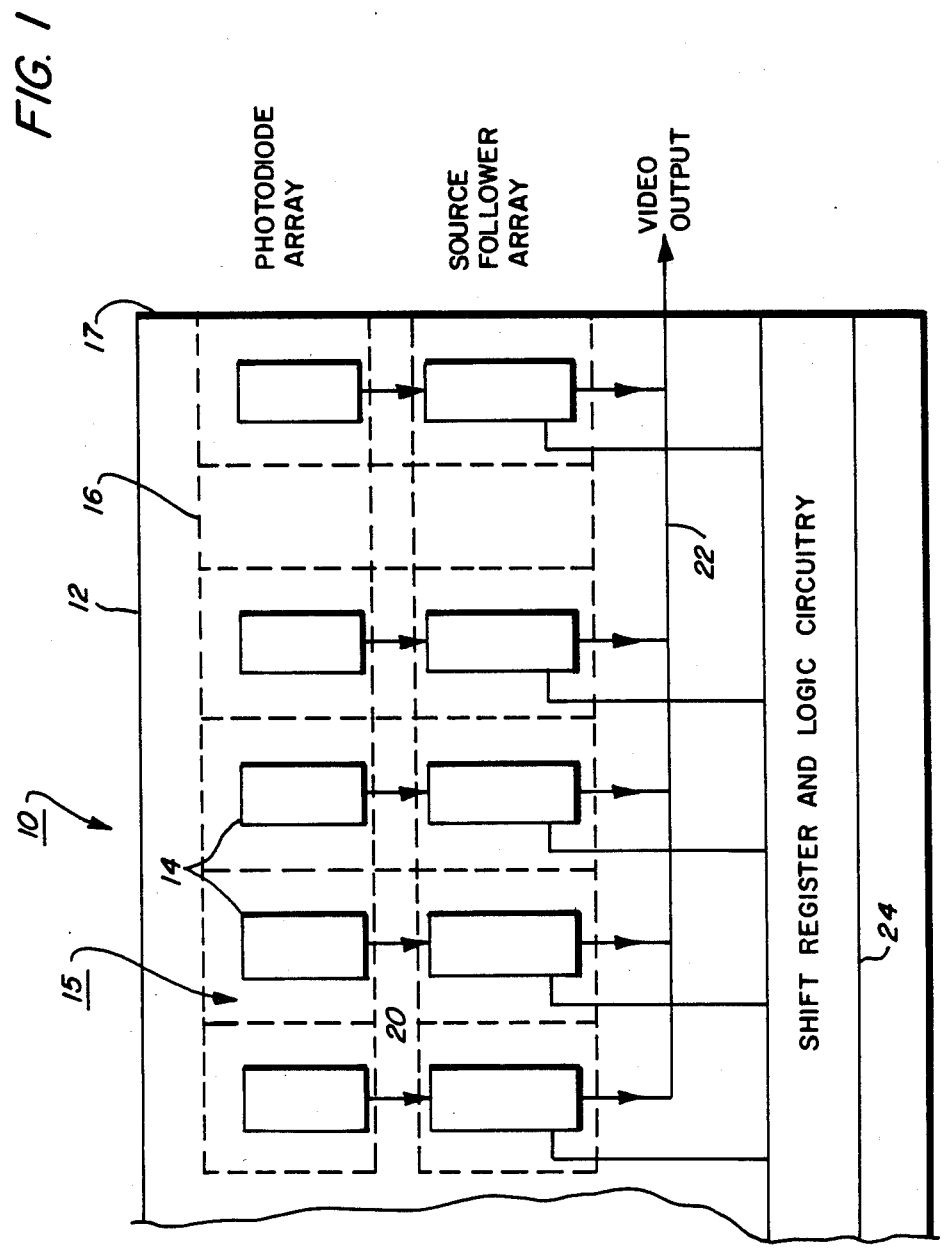
FIG. 1 is a schematic view of an image scanning array having an array of photosites in the form of photodiodes incorporating the two stage transfer of the present invention.

Referring to FIG. 1, there is shown the image sensor array with two stage transfer, designated generally by the numeral 10, of the present invention. Image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together end to end with one another to form a longer array, i.e. a full width or contact array, with spacing between the photodiodes at the butted ends the same as the spacing between the photodiodes inside the chip thereby maintaining photodiode pitch across the entire full width of the composite array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode form a pixel cell 15. In circuit 20, the image charge signal from the photodiode is transferred to the input of a source follower 33 (shown in FIGS. 2 and 3), which feeds the signal to an output line 22 as a voltage. In addition, the image signal charge is amplified due to the gain achieved during transfer of the image signal charge from photodiode 14 to the input of source follower 33. The signal gain results from the difference in capacitance between photodiode 14 and the input of source follower 33. This brings the image charge signal to a desired potential level prior to transferring the charge to line 22. Suitable shift register and logic circuitry 24 provides timing control signals for connecting each pixel cell 15 to line 22 in the proper timed sequence.

Image sensor array 10 may for example be used to raster scan a document original, and in that application, the document original and the sensor array 10 are moved or stepped relative to one another in a direction that is normally perpendicular to the linear axis of array 10. At the same time, the image line being scanned is illuminated and suitable optical means such as a gradient index fiber lens array provided to focus the photodiodes 14 on the image line. During an integration period, a charge is developed on each photodiode. This charge is proportional to the reflectance of the image area viewed by each photodiode. The image signal charges are thereafter transferred by the circuits 20 to output line 22 in a predetermined step by step timed sequence as will appear.

Figure 2:
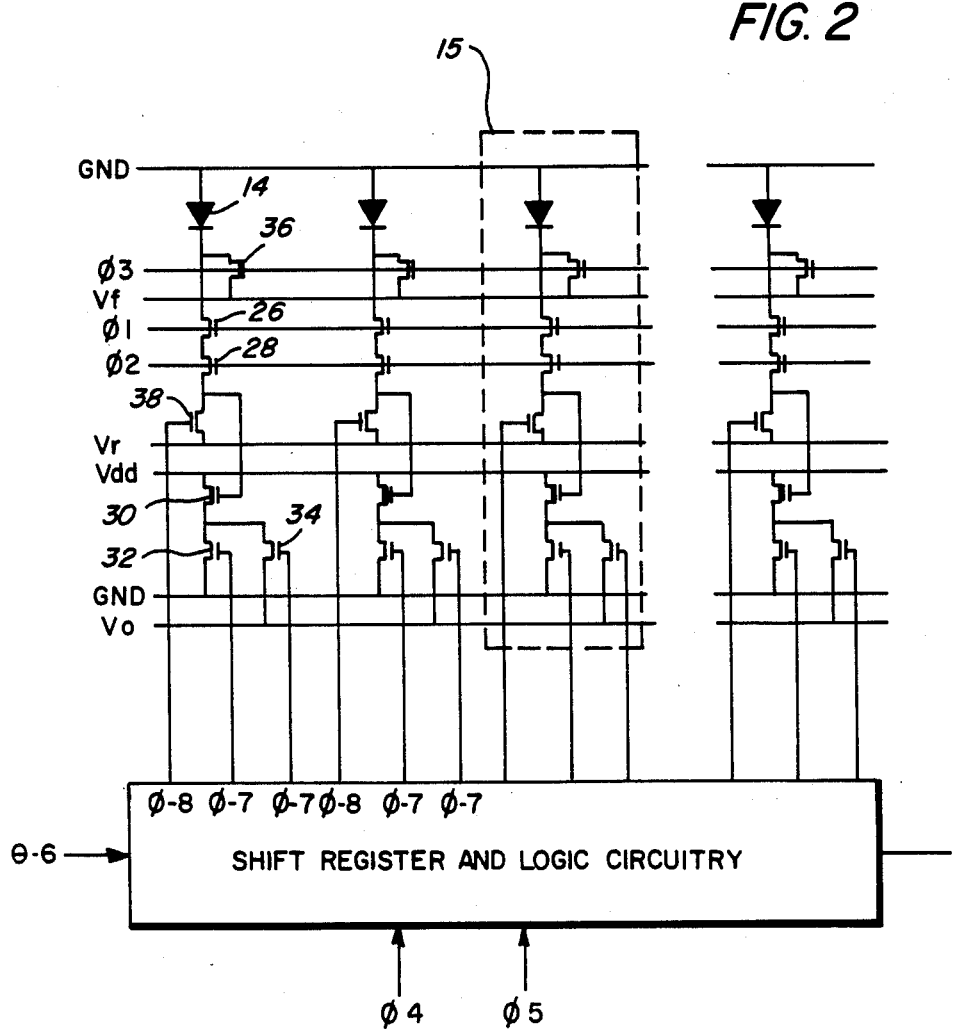
FIG. 2 is a circuit schematic showing details of the transfer circuit associated with each photodiode in the array for effecting two stage transfer of the image signals from the photodiodes to an output line.
Figure 3:
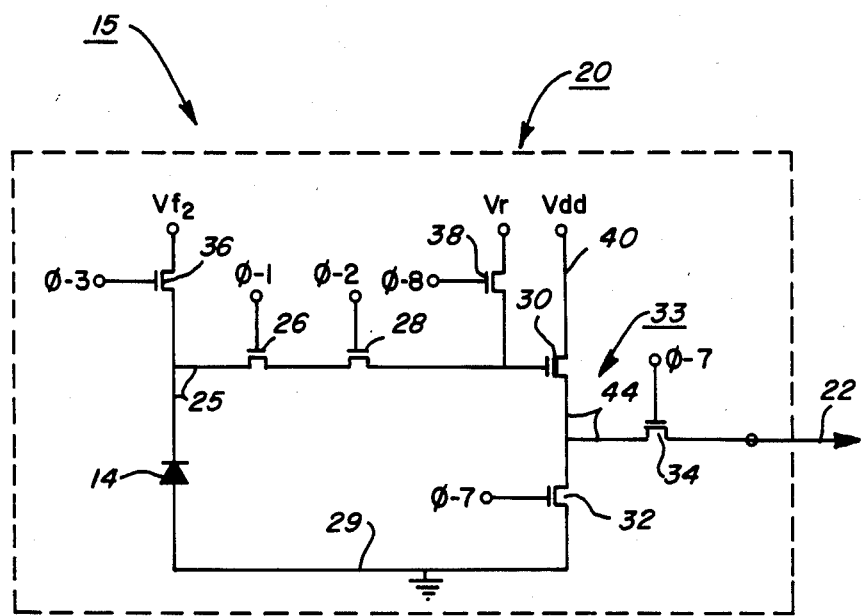
FIG. 3 is a detailed circuit schematic of the transfer circuit.

Referring particularly to FIGS. 2 and 3, each transfer circuit 20 includes a source follower or common drain amplifier 33 composed of transistors 30, 32 for converting the image signal charge to a voltage signal. Two stage transfer, consisting of transistors 26, 28 in series with the line 25 connecting one electrode of photodiode 14 with the gate of transistor 30 of source follower 33, is utilized for transferring the image signal charge from the photodiode 14 to source follower 33 to minimize feedback due to the transistor dynamic drain conductance effect. The other electrode of photodiode 14 and the source of transistor 32 are grounded through ground line 29.

The drain of transistor 30 is connected to a preset voltage potential V-dd by line 40. The source of transistor 30 and the drain of transistor 32 of source follower 33 are connected by line 44 to multiplexing transistor 34 which connects the pixel cell to output line 22. A charge injection transistor 36 is provided to inject a preset bias charge, for example, an electrical fat zero V-fz, into photodiode 14. A reset transistor 38 controls application of a reset signal from a predetermined reset signal source Vr to the gate of transistor 30 of source follower 33.

A suitable pixel clock (not shown) provides clock signals $\phi_1$, $\phi_2$ and $\phi_3$ controlling lateral transfer of the image signal charge from photodiodes 14 to source followers 33. Additional clock signals $\phi_4$ and $\phi_5$, and shift register clock signal $\phi_6$ are input to shift register and logic circuitry 24. Shift register and logic circuitry 24, which includes one or more shift registers, outputs clock signals $\phi_7$ and $\phi_8$ for operating transfer circuits 24 to amplify and transfer the image signal voltage from source followers 33 to output line 22 serially. As will be understood, clock signals $\phi_1$ through $\phi_6$ synchronize and integrate operation of scanning array 10 with other component parts of the scanning system with which array 10 is associated, and with additional arrays in the event array 10 is abutted with other like arrays to form a longer scanning array.

OPERATION

Figure 4:
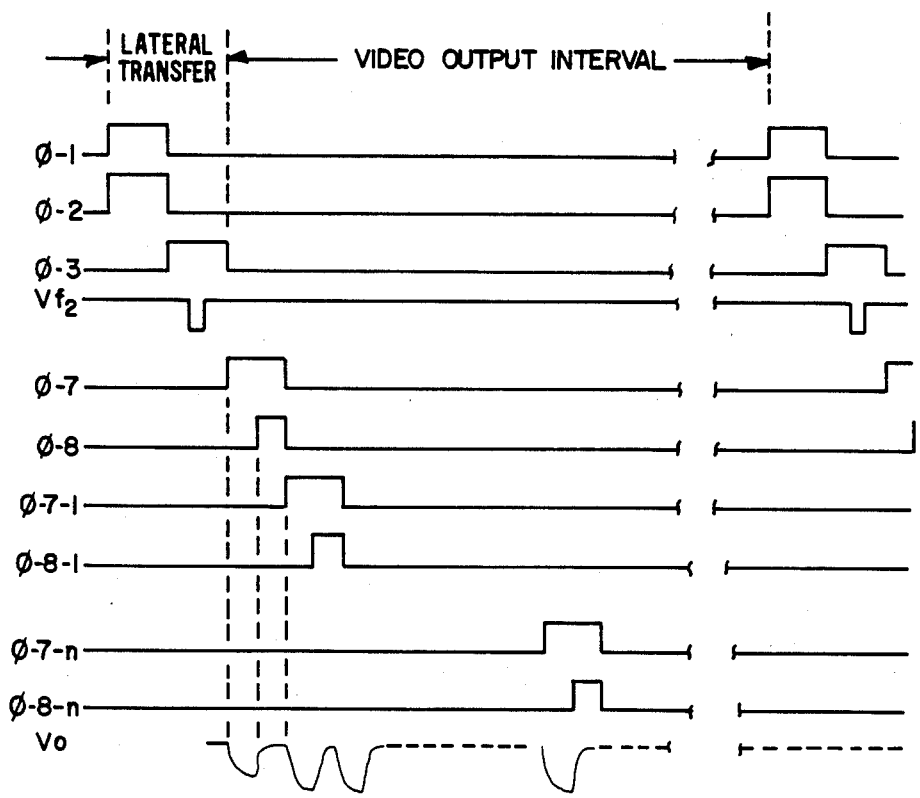
FIG. 4 is a timing diagram showing the operating clock signal waveform for the image scanning array with two stage transfer shown in FIG. 1.

In operation and referring particularly to FIGS. 2 and 4, following the integration period, a lateral charge transfer cycle for all photodiodes 14 is initiated in which clock signals $\phi_1$, $\phi_2$ actuate the two stage transfer transistors 26, 28 of circuit 20 for all pixel cells 15 concurrently. Transistors 26, 28 transfer the image signal charge built up on the individual photodiodes 14 during the integration period to the gates of transistors 30 of source follower 33. Thereafter, clock signals $\phi_3$ and Vfz actuates transistors 36 to place the bias voltage charge Vfz on the photodiodes 14.

Following the lateral charge transfer cycle, a video output cycle is commenced in which the clock signals $\phi_7$ and $\phi_8$ output by shift register and logic circuitry 24 are shifted successively along the row of transfer circuits of each pixel cell 15 to activate the source followers 33 and to serially connect the outputs of the source followers to output line 22. In each pixel cell, the clock signal $\phi_7$ input to the gate of transistor 32 of source follower 33 and the gate of output transistor 38 actuates transistors 32, 38 to output the image signal voltage Vo to line 22. Following a predetermined interval, clock signal $\phi_8$ triggers reset transistor 38 to apply reset signal Vr to the gate of transistor 30, resetting source follower 33 and terminating output of the signal voltage for that pixel cell.

The foregoing is repeated along the row of photodiodes 14 for each pixel cell 15 until the output corresponding to the last photodiode in the row 16 of photodiodes 14 has been transferred.

Figure 5:
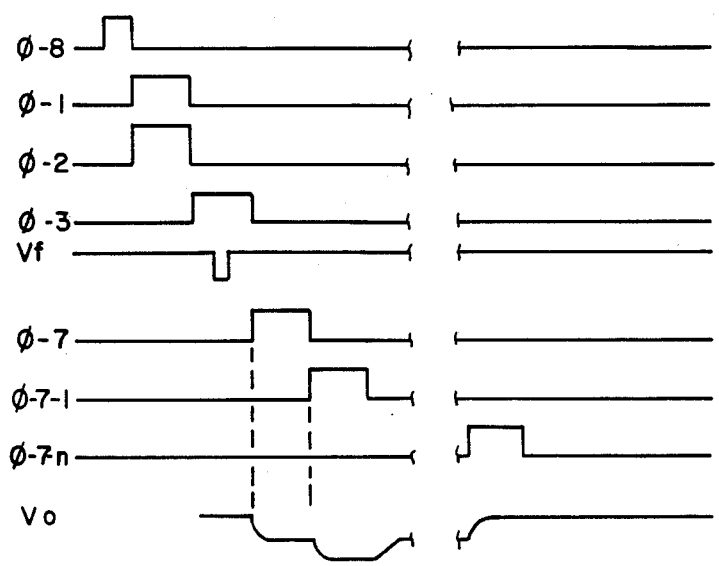
FIG. 5 is a timing diagram depicting a modified operating clock signal waveform for resetting the transfer circuits of the array photodiodes in unison.

In the embodiment shown in FIG. 5, where like numerals refer to all parts, clock signal $\phi_8$ is used to trigger the reset transistors 38 of all transfer circuits 20 simultaneously. Triggering of reset transistors 38 simultaneously applies reset potential Vr to the gates of transistors 30, resetting the source followers 33 of transfer circuits 20 in unison.

While the invention has been described with reference to the structure disclosed, it is not confined to the details set forth, but is intended to cover such modifications or changes as may come within the scope of the following claims.

We claim:

1. In an image sensor array having at least one array of photodiodes, means associated with each of said photodiodes for amplifying and transferring the image signal charges output by said photodiodes to an output line, comprising the combination of:
   (a) source follower means for each of said photodiodes for charge to voltage conversion of the image signal charges output by the said photodiodes to image signal voltages;
   (b) two stage transfer means for each of said photodiodes for transferring the image signal charges from said photodiodes to the input of the source follower means for that photodiode, transfer of said signal charge by said two stage transfer means amplifying said signal charge while minimizing feedback;
   (c) means associated with each of said photodiodes for injecting a bias charge on each of said photodiodes, said injecting means including a source of preset potential; and
   a switch for each of said photodiodes for coupling said potential to the photodiode associated therewith to apply said potential to the photodiode associated therewith whereby to inject said bias charge;
   (d) switching means associated with each of said photodiodes for coupling the output of each of said source follower means to said output line whereby the image signal charge from each of said photodiodes following charge to voltage conversion to said image signal voltage by each of said source follower means are transferred to said output line;
   (e) reset means associated with each of said photodiodes for resetting the source follower means for each of said photodiodes following output of said image signal voltage from each of said source follower means to said output line; and
   clock means for actuating said switch following transfer of the image signal charge from each of the photodiodes to the input of the source follower means associated therewith but before transfer of said image signal voltage to said output line by the switching means associated therewith.

2. In an image sensor array having at least one array of photodiodes, means associated with each of said photodiodes for amplifying and transferring the image signal charges output by said photodiodes to an output line, comprising the combination of:
   (a) source follower means for each of said photodiodes for charge to voltage conversion of the image signal charges output by the said photodiodes to image signal voltages;
   (b) two stage transfer means for each of said photodiodes for transferring the image signal charges from said photodiodes to the input of the source follower means for that photodiode, transfer of said signal charge by said two stage transfer means amplifying said signal charge while minimizing feedback;
   (c) means associated with each of said photodiodes for injecting a bias charge on each of said photodiodes;
   (d) switching means associated with each of said photodiodes for coupling the output of each of said source follower means to said output line whereby the image signal charge from each of said photodiodes following charge to voltage conversion to said image signal voltage by each of said source follower means are transferred to said output line;

(e) reset means associated with each of said photodiodes for resetting the source follower means for each of said photodiodes following output of said image signal voltage from each of said source follower means to said output line; and (f) clock means for actuating said two stage transfer means for each of said photodiodes in unison to transfer the image signal charges from the photodiode associated therewith to the input of the source follower means associated therewith and then actuating said injecting means for all of said photodiodes in unison to inject said bias charge on all of said photodiodes in unison, said clock means thereafter actuating the switching means associated with each of said photodiodes individually in succession to serially transfer the image signal voltage from the source follower means associated with each of said photodiodes to said output line.

3. An image sensor array having high transfer efficiency and responsivity comprising, in combination:
(a) an output line;
(b) an array of photodiodes for scanning an image, and
(c) a transfer circuit for each of said photodiodes for transferring the image signal charges of the associated photodiode of each of said circuits to said output line including
  (1) a source follower;
  (2) first and second control gates in series with one another and forming a two stage transfer pair for transferring the image signal charge on the photodiode to the input of said source follower;
  (3) a third control gate for applying a predetermined bias potential to said photodiode for said source follower;
  (4) a fourth control gate for coupling the output of said source follower to said output line;
  (5) first clock means for simultaneously actuating said first and second control gates of all said photodiodes to transfer the image signal charges from said photodiodes to the source followers of the transfer circuit associated therewith in unison, and thereafter actuating said third control gates simultaneously to apply said predetermined potential to said photodiodes in unison; and
  (6) second clock means for actuating the fourth control gate of each of said transfer circuits one after the other to serially output the image signal charge from each of said source followers to said output line to provide a succession of image signals in said output line.

4. The image sensor array according to claim 3 including
a source of reset potential for resetting said source followers, each of said transfer circuits further including;
a fifth control gate for coupling said reset potential to said source follower to reset said source follower and terminate output of said image signal from said source follower,
said second clock means actuating said fifth control gate a predetermined time after actuation of said fourth control gate to terminate output of the image signal from said source follower to said output line.

5. The image sensor array according to claim 3 including:
a source of reset potential for resetting said source followers, each of said transfer circuits further including;
(a) a fifth control gate for coupling said reset potential to said source follower to reset said source follower and terminate output of said image signal from said source follower; and
(b) third clock means for actuating said fifth control gate of all of said transfer circuits at the same time to thereby simultaneously reset the source followers of said transfer circuits in unison.

* * * * *